US008726019B2

(12) United States Patent
Paddon et al.

(10) Patent No.: US 8,726,019 B2
(45) Date of Patent: May 13, 2014

(54) CONTEXT LIMITED SHARED SECRET

(75) Inventors: Michael Paddon, Kellyville (AU); Gregory Gordon Rose, San Diego, CA (US); James Semple, London (GB); Philip Michael Hawkes, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 1579 days.

(21) Appl. No.: 11/351,448

(22) Filed: Feb. 10, 2006

(65) Prior Publication Data

US 2007/0174613 A1  Jul. 26, 2007

Related U.S. Application Data

(60) Provisional application No. 60/652,063, filed on Feb. 11, 2005.

(51) Int. Cl.
*H04L 29/06* (2006.01)

(52) U.S. Cl.
USPC .......... 713/168; 713/169; 713/170; 713/171; 380/270; 380/271; 380/272; 380/273; 380/274; 380/283; 380/284; 380/285; 726/16; 726/17; 726/18; 726/19; 726/20; 726/21; 726/27; 726/28; 726/29; 726/30

(58) Field of Classification Search
USPC .......... 715/700, 781, 744; 713/168–172, 151; 726/5, 16–21, 27–30; 382/228; 705/67; 52/29; 380/270–274, 280–285
See application file for complete search history.

(56) References Cited

U.S. PATENT DOCUMENTS

| | | | |
|---|---|---|---|
| 5,432,850 A * | 7/1995 | Rothenberg | 713/162 |
| 5,661,806 A | 8/1997 | Nevoux et al. | |
| 5,668,877 A | 9/1997 | Aziz | |
| 5,794,136 A | 8/1998 | Buchwald et al. | |
| 5,794,139 A * | 8/1998 | Mizikovsky et al. | 455/403 |
| 6,230,201 B1 * | 5/2001 | Guck et al. | 709/228 |
| 6,292,896 B1 * | 9/2001 | Guski et al. | 713/169 |
| 6,907,246 B2 | 6/2005 | Xu et al. | |

(Continued)

FOREIGN PATENT DOCUMENTS

| | | |
|---|---|---|
| JP | 6152592 | 5/1994 |
| JP | 759154 | 3/1995 |

(Continued)

OTHER PUBLICATIONS

Sherry Wang et. Al., "Cyber Security and Trusted Computing", Oct 31, 2012, Trusted Communications . . . Awarness to Action.*

(Continued)

*Primary Examiner* — Taghi Arani
*Assistant Examiner* — Josnel Jeudy
(74) *Attorney, Agent, or Firm* — Kristine U. Ekwueme (57) ABSTRACT

In a communication system in which two communication entities seek to have a private or confidential communication session, a trust relationship needs first be established. The trust relationship is based on the determination of a shared secret which in turn is generated from contextual information. The contextual information can be derived from the circumstances surrounding the communication session. For example, the contextual information can include topological information, time-based information, and transactional information. The shared secret may be self-generated or received from a third party. In either event, the shared secret may be used as key material for any cryptographic protocol used between the communication entities.

42 Claims, 6 Drawing Sheets

(56) References Cited

U.S. PATENT DOCUMENTS

| | | | |
|---|---|---|---|
| 7,123,721 B2* | 10/2006 | Panjwani et al. | 380/270 |
| 7,162,237 B1* | 1/2007 | Silver et al. | 455/432.3 |
| 7,512,973 B1* | 3/2009 | Chan et al. | 726/10 |
| 7,532,723 B2* | 5/2009 | Chitrapu et al. | 380/44 |
| 2003/0040306 A1 | 2/2003 | Kentaro et al. | |
| 2003/0186651 A1* | 10/2003 | Weston et al. | 455/39 |
| 2003/0208677 A1* | 11/2003 | Ayyagari et al. | 713/168 |
| 2004/0098588 A1* | 5/2004 | Ohba et al. | 713/169 |
| 2004/0157585 A1* | 8/2004 | Sashihara | 455/411 |

FOREIGN PATENT DOCUMENTS

| | | |
|---|---|---|
| JP | 7202882 | 8/1995 |
| JP | 88899 | 1/1996 |
| JP | 2002123172 A | 4/2002 |
| JP | 2002185443 | 6/2002 |
| JP | 2004023365 | 1/2004 |
| JP | 2004207965 | 7/2004 |
| JP | 2004208073 | 7/2004 |
| JP | 2006506908 | 2/2006 |
| JP | 2008506317 | 2/2008 |
| RU | 2163745 C2 | 2/2001 |
| WO | WO03028281 A2 | 4/2003 |
| WO | WO 2004021719 * | 4/2004 |

OTHER PUBLICATIONS

Taiwan Search Report—TW095104648—TIPO—Apr. 12, 2012.
International Search Report and Written Opinion—PCT/US06/004901, International Searching Authority, European Patent Office, Jan. 12, 2007.
Menez, Oorschot Vanstone, "Handbook of Applied Cryptography," CRC Press Series on Discrete Mathematics and Its Applications, 1997, Chapter 10, pp. 498-499 and Chapter 12, pp. 397-400, XP002412962.

* cited by examiner

CONTEXT LIMITED SHARED SECRET

CLAIM OF PRIORITY UNDER 35 U.S.C §119

The present application for patent claims priority to U.S. Provisional Application No. 60/652,063, entitled "Context Limited Secret Key," filed on Feb. 11, 2005, and assigned to the assignee hereof and expressly incorporated by reference herein.

BACKGROUND

I. Field

The present invention generally relates to communications, and more particularly, to secure and private communications using shared secrets generated from context limited information.

II. Background

The use of shared secrets is common for communications that are intended to be secure or private. In a typical shared secret scheme, a common secret known only to the communicating entities is shared, which secret is relied upon by the communicating entities to establish a trust relationship. A party without the shared secret is excluded from the trust relationship.

The shared secret can either be permanent or temporary. A temporary shared secret can be used to protect a communication for a limited period. For example, the temporary shared secret can be good only for a one-time transaction.

To provide an extra level of security, very often, a temporary secret is derived from a permanent secret. In such an arrangement, the temporary secret is used as the basis for establishing the trust relationship. For instance, a party seeking to establish a trust relationship with a corresponding party may use the temporary secret, which is shared with the corresponding party as key material for cryptographic communications with the corresponding party.

As for the permanent secret, sometimes called the master secret, it is rarely unrestrictively shared. By way of example, in a mobile communication setting, a master secret is shared only between the subscriber unit and the subscriber's home carrier. When the subscriber unit requests services via secure communications from a third party, the subscriber unit generates a temporary secret from the master secret. At the same time, the subscriber unit also sends a request to the home carrier which in turn generates the same temporary secret from the shared master secret. Again, the temporary secret forms the basis of the trust relationship between the subscriber and the third party. For instance, both the subscriber unit and the home carrier may generate from the temporary secret, among other things, an encryption key which is then made available to the service provider. Cryptographic communications between the subscriber unit and the service provider can be exchanged thereafter.

The rationale for deriving a temporary secret from the master secret is to curtail likelihood of revelation of the master secret. Derivation of the temporary secret from the master secret can be based on some prearranged algorithms between the subscriber unit and the home carrier.

The above-described security model is based on the assumption that any third party who may have access to any derived secret would have an interest in preserving the confidentiality of the derived secret. For instance, if the third party reveals the derived secret to yet another party, the confidence in purchasing services from the third party would be seriously jeopardized. As such, the third party would be adversely affected as a sustaining business entity, not to mention the legal consequences of revealing the secret.

However, there may be some parties that neither have the economical motivation nor ethical consideration in keeping the shared secret a secret. For example, if the derived secret is passed to a rogue party set up as a subscriber, the rogue party can use the derived secret to impersonate the legitimate subscriber and gain access to services which otherwise would be inaccessible to the rogue party. To compound the situation, additional sensitive information can further be revealed from the illegitimate access. The same holds true, if not with more severe consequences, is that the rogue party sets itself up as a service provider.

Accordingly, there is a need to provide a more secure communication scheme to prevent the revealing and misuse of derived secrets.

SUMMARY

In a communication system in which two communication entities seek to have a private or confidential communication session, a trust relationship needs first be established. The trust relationship is based on the determination of a shared secret which is generated from a master secret and selected contextual information. The contextual information can be derived from the circumstances surrounding the communication session. The shared secret may be self-generated by each communication entity. Alternatively, the shared secret may be received from a third party in the case that the entity does not possess enough information to derive the shared secret directly. The shared secret can be used as key material for cryptographic protocols used to authenticate and to establish secure communications between the communication entities.

In an exemplary embodiment, a subscriber unit as one communication entity seeks service from a service provider as another communication entity. The subscriber unit generates the shared secret on its own based on a pre-stored master secret and predetermined contextual information which can include but is not limited to topological information, time-based information, and transactional information. The service provider which does not possesses the master secret obtains the shared secret from yet another entity. Afterward, the service provider and the subscriber unit use their common knowledge of the shared secret to establish a trust relationship. In this instance, the other entity is home carrier of the subscriber unit. Prior to sending the shared secret to the service provider, the home carrier generates the shared secret in substantially the same manner as the subscriber unit. Sending of the shared secret from the home carrier to the service provider may be also protected via pre-agreed upon protective mechanisms.

Operating in the manner as described, the shared secret generated is thus less likely to be illegitimately duplicated and misused.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Figure 1:
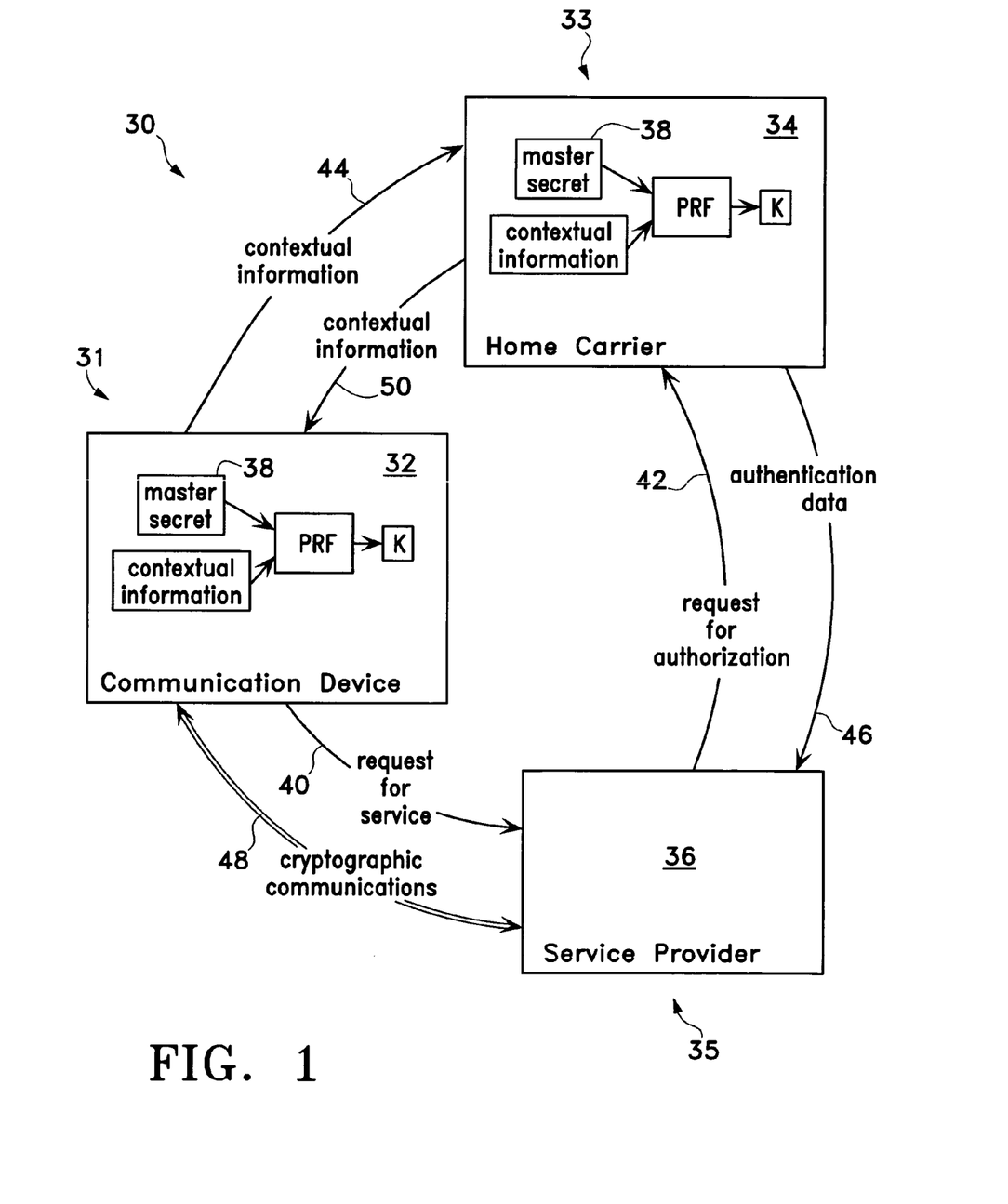
FIG. 1 is a simplified schematic drawing showing a general embodiment of the invention.

FIG. 1 shows a simplified schematic drawing of a general embodiment of the invention. The communication system is overall signified by the reference numeral 30 which can a system carrying voice, data, multimedia, or combination thereof. Furthermore, the system 30 can be operated under various standards and protocols, examples are the cdma2000 (Code Division Multiplex Access 2000), GSM (Global System for Mobile communication), WCDMA (Wideband Code Division Multiple Access), and IP (Internet Protocol).

For a clear and concise illustration, only three entities are shown in FIG. 1, namely, a first communication entity 31, a second communication entity 33, and a third communication entity 35. In this exemplary embodiment, the first entity 31 is a communication device 32. The second entity 33 is a home carrier 34. The third embodiment 35 is a service provider 36.

Suppose in this example, the communication device 32 is a subscriber of the home carrier 34. The communication device 32 can be a wired device, for example, the device 32 can be a work station wired to the same network as the home carrier 34. Alternatively, the communication device 32 can be a wireless device. For instance, the device 32 can be a mobile telephone, a mobile computer, or a personal digital assistant (PDA). As such, the communication device 32 can be within the same network as the home carrier 34. In addition, the communication device 32 can also be positioned outside of the network of the home carrier 34. For example, the communication device 32 may roam away from the network of the home carrier 34 to other networks and may communicate with other entities in other networks.

Reference is now directed back to FIG. 1. Suppose in this example, the communication device 32 requests a service from the service provider 36. The service requested can be a service normally requested from the home carrier 34 when the communication device 32 is in the network of the home carrier 34. As another example, the service requested can also be a service provided only by the service provider 36 but not by the home carrier 34. The service provider 36 can be within or beyond the network of the home carrier 34.

For security and privacy reasons, the communication device 32 may first want to ensure that the service provider 36 is authorized for the provision of the service. Likewise, the service provider 36 in turn may also need to know that the communication device 32 is legitimate, for example, for purpose of billing. Differently put, prior to any communication, a trust relationship needs first be established between the communication device 32 and the service provider 36.

In accordance with this embodiment, the communication device 32 and the home carrier 34 share a master secret, symbolically identified by the reference numeral 38 in FIG. 1.

To start the process, the communication device 32 first sends a request of service to the service provider 36, signified by the communication path 40. Thereafter, the process of establishing a trust relationship follows.

For the communication device 32, it first generates a shared secret K via a pseudo-random function (PRF). Inputs to the PRF can include, among other things, the master secret 38 and contextual information.

Examples of a PRF can be a Hash-based Message Authentication Code (HMAC), a Secure Hash Algorithm 1 (SHA-1), or a combination thereof. Both the HMAC and the SHA-1 can be found in Request for Comments (RFC) published by the Internet Engineering Task Force (IETF). Specifically, the HMAC is set fort in RFC 2104, entitled "HMAC: Keyed-Hashing for Message Authentication,' February 1997. The SHA-1 algorithm is defined in RFC 3174, entitled "U.S. Secure Hash Algorithm 1," September 2001.

In accordance with this embodiment of the invention, contextual information can be derived from the circumstances surrounding the communication session.

Contextual information can be topologically based. For instance, operating under the IP, the topological information can include the source and destination addresses of the various entities 31, 33 and 35 as shown in FIG. 1. In addition, the aforementioned addresses can additionally include network masks specifying blocks of addresses for an additional level of security. For communications under the Transport Control Protocol (TCP) and User Datagram Protocol (UDP), source and destination ports can also be included.

Contextual information can also be time related. That is, certain time parameters surrounding the circumstances of the communication session can be used for the contextual information. For example, the contextual information can include the start time, end time, duration of a particular communication session, such as the session of the service request 40 sent by the communication device 32 to the service provider 36.

Contextual information can also be transactionally specific. Very often, under various communication systems, each communication session is uniquely identified with an identifier, commonly called a nonce or a transactional identifier. Such identifying information can also be used and included as contextual information.

As mentioned earlier, to generate a shared secret K, inputs to the PRF can include the master-secret and the contextual information. Mathematically, it can be represented as follows:

$$K=\text{PRF}(master\_secret, contextual\_information) \quad (A)$$

where master_secret is for example, the master secret 38 as aforementioned, and contextual_information can further be represented as follows:

$$contextual\_information = U(server\_address, server\_port, start\_time, end\_time, random\_nonce) \quad (B)$$

where U denotes a set of parameters as included in the parenthesis of equation (B). In this particular example, server_address is the network address of the service provider 36, server_port is the port number of the service provider 36, start_time is the beginning of the time of the communication device 32 sends the service request 40 to the service provider 36, end_time is the end of the time the aforementioned service request ends.

On the part of the service provider 36, upon receipt of the request of service from the communication device 32, the service provider 36 informs the home carrier 34 for authorization, as identified by the communication path 42 in FIG. 1. At the same time, either out of its own initiative or upon request from the home carrier 34, the communication device 32 sends the contextual information to the home carrier 34, as identified by the communication path 44. With the contextual information and the prestored master secret 38, the home carrier 34 in turn generates a shared secret K in accordance with equations (A) and (B) in the same manner as the communication device 32 generating the shared secret K as described previously.

The shared secret K provides supporting basis for subsequent secure communications between the service provider 36 and the communication device 32.

For example, for secure and private communications, various cryptographic protocols can be later used between the service provider 36 and the communication device 32. Each of the cryptographic protocols may require an encryption key Ke to encrypt the secure communication data. The encryption key Ke can be generated from the shared secret K.

As another example, if applicable, the shared secret K can be used to generate challenge data exchanged between the service provider 36 and the communication device 32. The challenge data may include a challenge message and an expected response. The expected response can only be generated from the challenge message and with the knowledge of the shared secret K. For instance, referring to FIG. 1, if the service provider 36 has received the shared secret K from the home carrier 34, the service provider 36 may challenge the authenticity of the communication device 32 by sending a challenge message to the communication device 32. The communication device 32 has possession of the shared secret K. The communication device 32 can then generate an expected message based on the shared secret K and send the expected message to the service provider 36 for authentication. The service provider 36 may thereafter determine the authentication of the communication device 32 by comparing the received expected message from communication device 32 and its self-generated expected message based on the share secret K which was previously received from the home carrier 34.

Reference is now continued with FIG. 1. In response to the request for authorization 32 and depending on the cryptographic protocol to be used later, the home carrier 33 sends authentication data, which in this example includes the shared secret K to the service provider 36, as identified by the communication path 46. The transmission of the authentication data via the communication path 46 may be protected by pre-arranged security mechanisms.

Once the communication device 32 and the service provider 36 possess the shared secret K, they can use the secret K as key material to establish cryptographically secured communications. The communication path of the cryptographic communications between the communication device 32 and the service provider 36 is denoted by the reference numeral 48 as shown in FIG. 1.

Figure 2A:
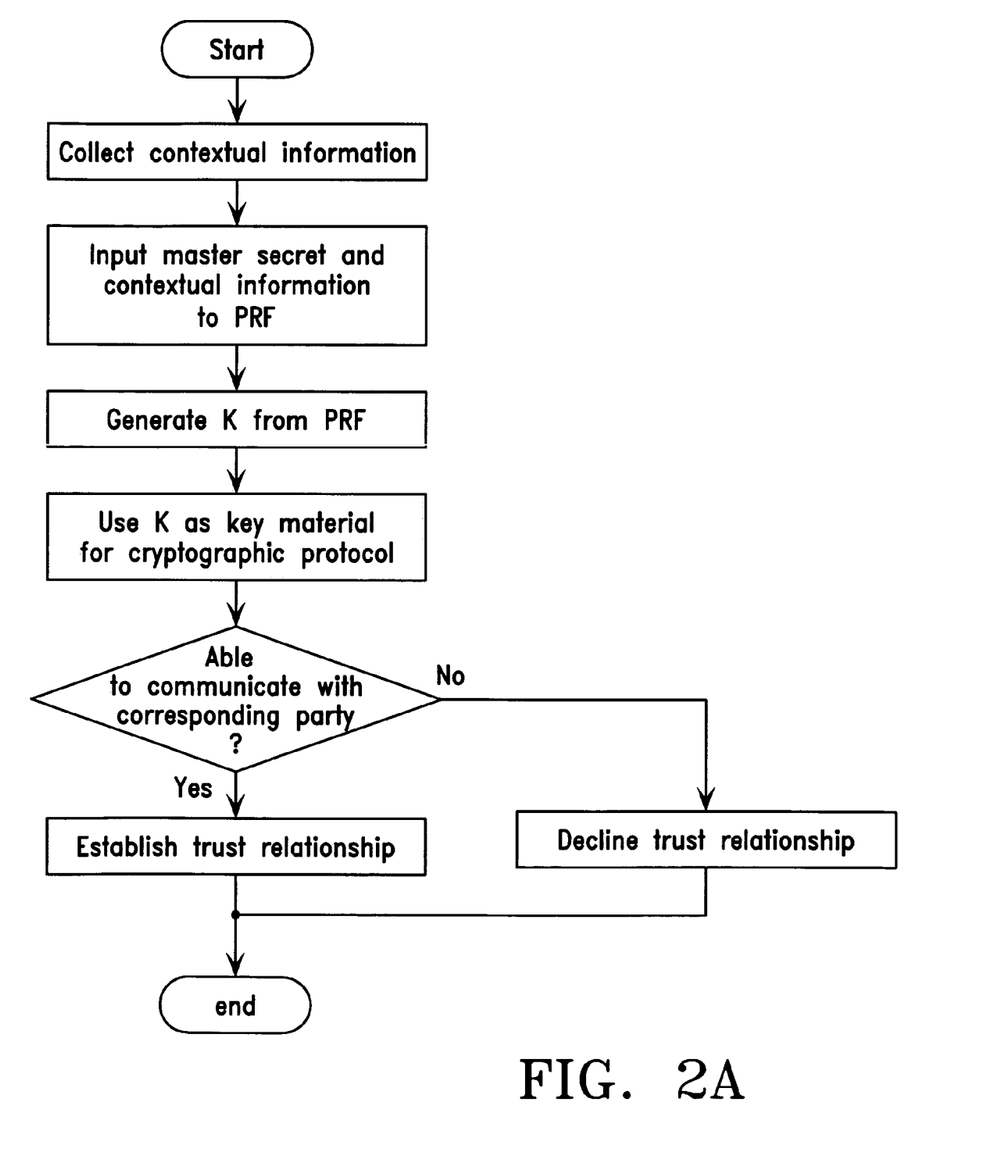
FIG. 2A is a flowchart in accordance with one embodiment showing the steps involved by a communication entity seeking first to establish a trust relationship for a communication session.
Figure 2B:
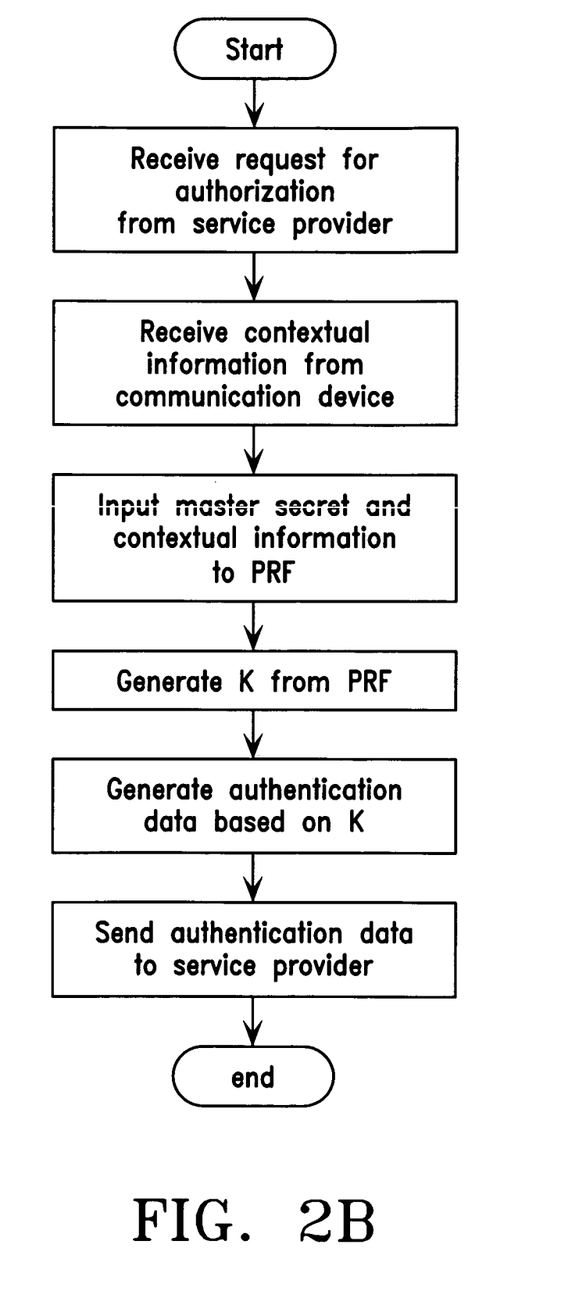
FIG. 2B is a flowchart in accordance with the embodiment of FIG. 2A showing the steps involved by an intermediary entity facilitating to establish the trust relationship.

The process as described above is summarized in the flowcharts of FIGS. 2A and 2B. FIG. 2A shows the process steps executed by the communication device 32. FIG. 2B shows the corresponding process steps performed by the home carrier 34.

Operating in the manner as described above, if the shared secret K is improperly divulged to an unauthorized party, the likelihood of unauthorized use of the secret K by the unauthorized party to masquerade as a legitimate secret holder is substantially reduced because the exact contextual information for which the shared secret K was originally generated must be replicated in order to succeed.

Figure 3A:
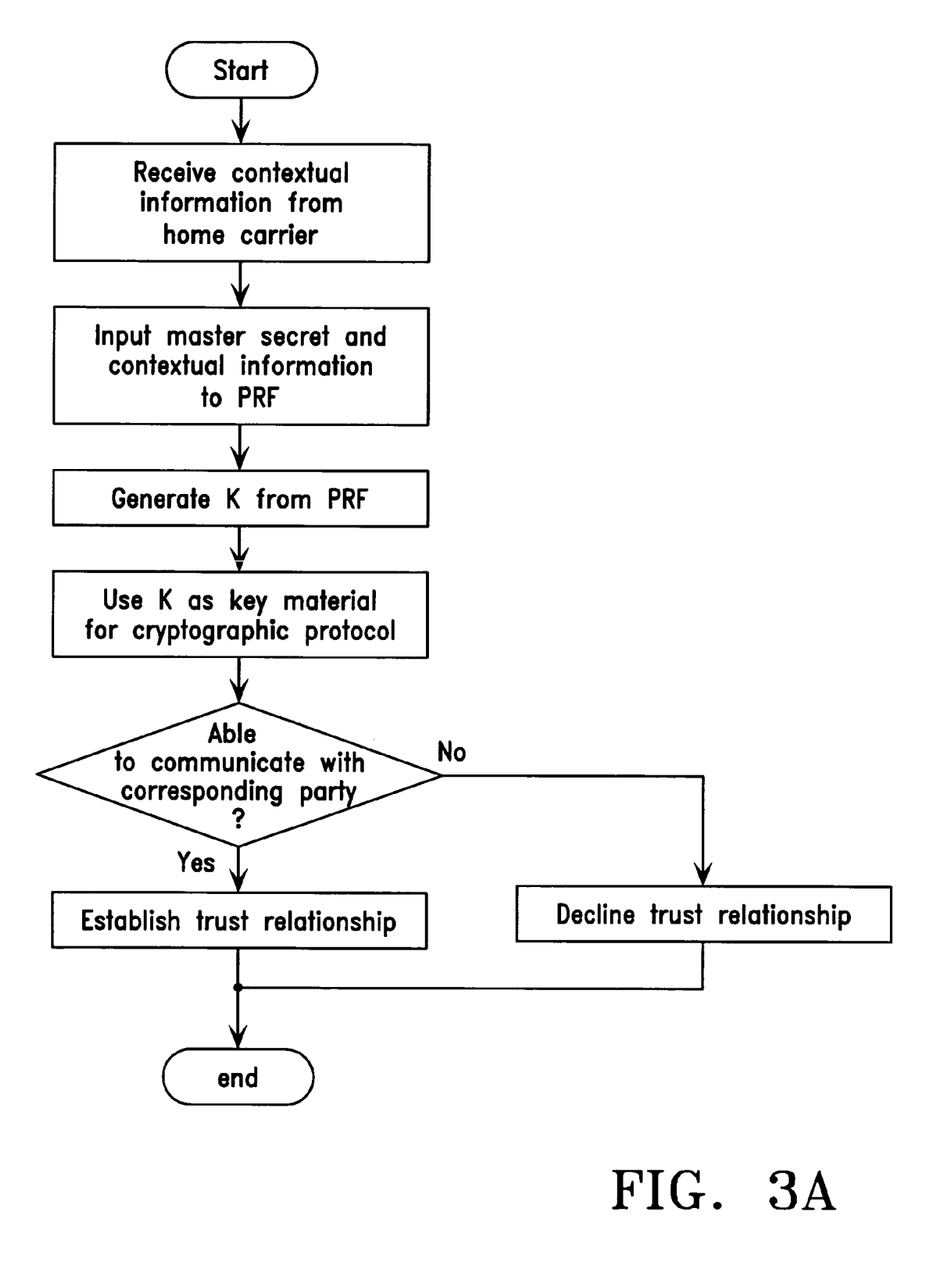
FIG. 3A is a flowchart in accordance with another embodiment showing the steps involved by the communication entity seeking first to establish a trust relationship for the communication session.
Figure 3B:
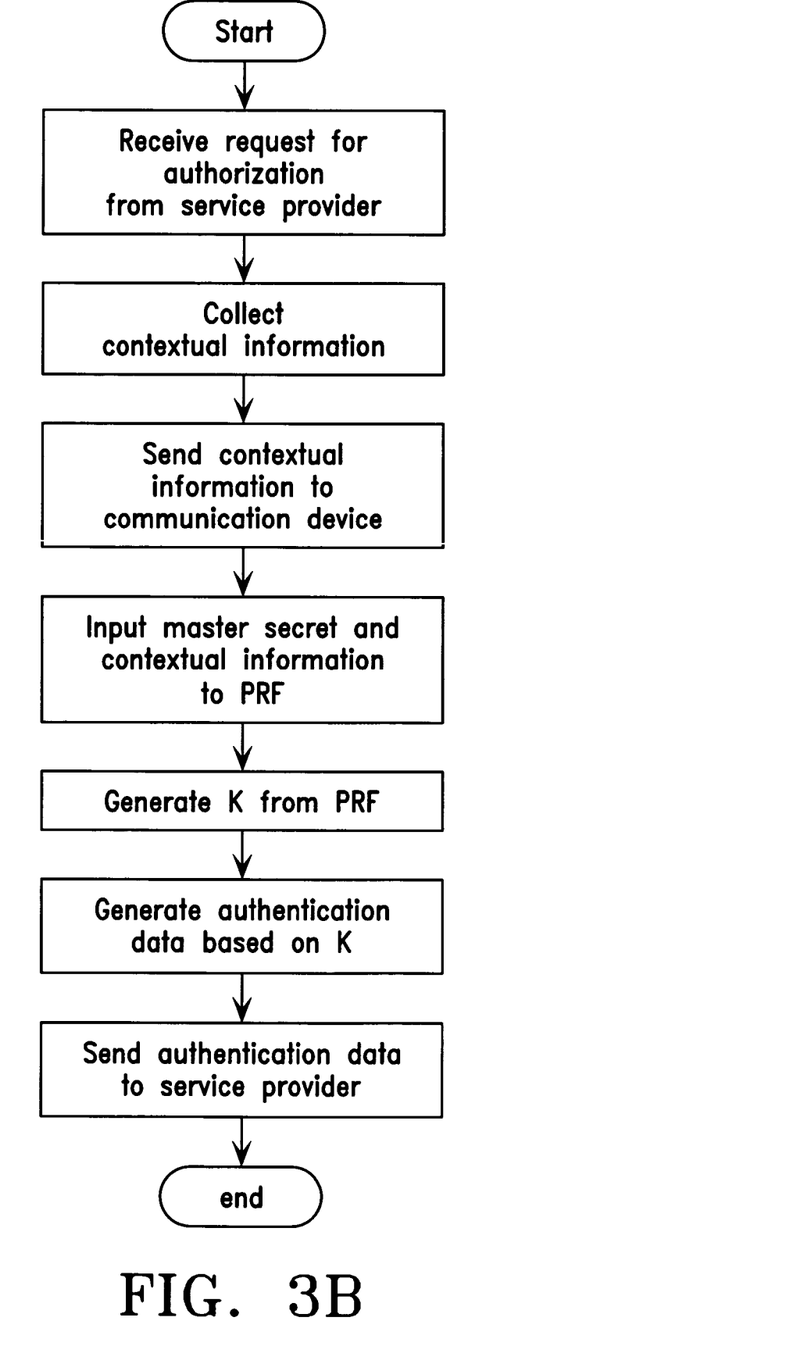
FIG. 3B is a flowchart in accordance with the embodiment of FIG. 3A showing the steps involved by the intermediary entity facilitating to establish the trust relationship.

Alternatively, instead of having the communication device 32 send the contextual information to the home carrier 38, the reverse can also be possible. That is, upon receipt of the request for authorization from the service provider 36, the home carrier 38 can send the contextual information to the communication device 32. For instance, the predetermined parameters start_time and end_time in Equation (B) can be set at respectively the start and end times of the authorization request 42 as shown in FIG. 1. The communication device 32 can then use the received contextual information to generate the shared secret K. Again, the shared secret K again may be used as key material appropriate to any cryptographic protocol to be used for cryptographic communications between the communication device 32 and the service provider 36. The process is substantially similar to that as described above and is summarized in the flowcharts of FIGS. 3A and 3B. FIG. 3A shows the process steps executed by the communication device 32. FIG. 3B shows the corresponding process steps performed by the home carrier 34.

Figure 4:
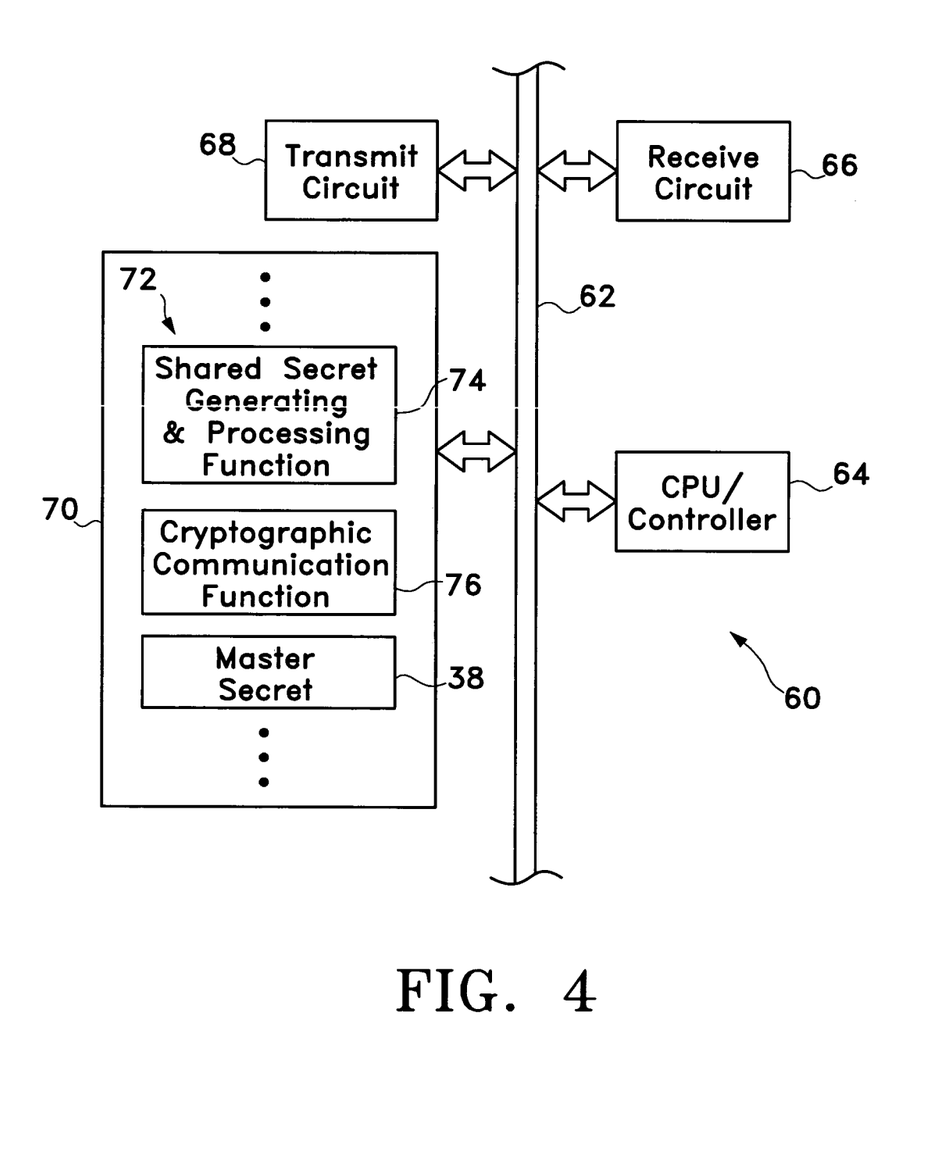
FIG. 4 is schematic drawing showing part of the hardware implementation for carrying out the embodiments of the invention.

FIG. 4 schematically shows the part of the hardware implementation of an apparatus, such as the communication entities 31 and 33 shown in FIG. 1, signified by the reference numeral 60 in accordance with the exemplary embodiment of the invention. The apparatus 60 can be built and incorporated in various forms, such as a stationary computer, part of a network hardware, a laptop computer, a PDA, or a cellular phone, to name just a few.

The apparatus 60 comprises a central data bus 62 linking several circuits together. The circuits include a CPU (Central Processing Unit) or a controller 64, a receive circuit 66, a transmit circuit 68, and a memory unit 70.

If the apparatus 60 is part of a wireless device, the receive and transmit circuits 66 and 68 can be connected to a RF (Radio Frequency) circuit but is not shown in the drawing. The receive circuit 66 processes and buffers received signals before sending out to the data bus 62. On the other hand, the transmit circuit 68 processes and buffers the data from the data bus 62 before sending out of the device 60. The CPU/controller 64 performs the function of data management of the data bus 62 and further the function of general data processing, including executing the instructional contents of the memory unit 70.

Instead of separately disposed as shown in FIG. 4, as an alternative, the transmit circuit 68 and the receive circuit 66 can be parts of the CPU/controller 64.

The memory unit 70 includes a set of instructions generally signified by the reference numeral 72. In this embodiment, the instructions include, among other things, the process steps as shown and described in the flowcharts of FIGS. 2A, 2B, 3A and 3B, depending on the role played by the apparatus 60, which steps are collectively designated by the reference numeral 74 as a "shared secret generating and processing function" as shown in FIG. 4. Included in the function 74 can be the PRF as described previously.

Included in the memory unit 70 is also a cryptographic communication function 76 for carrying out any cryptographic protocol chosen. Furthermore, stored within the same memory unit 70, among other things, is the master secret 38. The functions 74, 76 and the master secret 38 can be transferred from a different memory unit (not shown) to the memory unit 70, e.g., during power up of the apparatus 60.

In this embodiment, the memory unit 70 is a RAM (Random Access Memory) circuit. The exemplary instruction portions 72 are software routines or modules. As mentioned above, the memory unit 70 can be tied to another memory circuit (not shown) which can either be of the volatile or nonvolatile type. As an alternative, the memory unit 70 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the processes as described and shown in FIGS. 2A, 2B, 3A and 3B above can also be coded as computer-readable instructions carried on any computer-readable medium known in the art. In this specification and the appended claims, the term "computer-readable medium" refers to any medium that participates in providing instructions to any processor, such as the CPU/controller 64 shown and described in FIG. 4, for execution. Such a medium can be of the storage type and may take the form of a volatile or non-volatile storage medium as also described previously, for example, in the description of the memory unit 70 in FIG. 4. Such a medium can also be of the transmission type and may include a coaxial cable, a copper wire, an optical cable, and the air interface carrying acoustic or electromagnetic waves capable of carrying signals readable by machines or computers.

Finally, described in the embodiment, the first, second and third communication entities 31, 33 and 35 are respectively described as the communication device 32, the home carrier 34, and the service provider 36. Different arrangements are possible within the invention. For instance, the first entity 31 can assume a different form, such as a router, part of a network or a carrier, instead of a device. Likewise, the second and third entities 33 and 35 may also assume different forms as mentioned previously. In the exemplary embodiment, the shared secret is described as generated from the master secret along with the contextual information. It is conceivable that the shared secret can also be generated with more information other than that listed in Equation (A) above. For example, non-contextual information, such as the coordinates from the Global Positioning System (GPS) or the electronic identification of the communication entities can certainly serve as additional input to Equation (A). The same hold true with Equation (B) which can include other contextual information other than that as described. On the other hand, not all the contextual information as described in the exemplary embodiments needs to be included to generate the shared secret. It is possible to use only partial or selected information. For instance, instead of using various topological, time-related, and transactional information for the generation of the shared secret as described, only selected topological information can be inputted to the PRF to arrive at a shared secret. Furthermore, in the exemplary embodiments, the communication device 32 and the home carrier 34 are described as the entities collecting the contextual information. It surely is feasible that the service provider 36 performs the duty of contextual information collection and sends the collected information directly or indirectly to other parties. In addition, any logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method for establishing a trust relationship with a communication entity, comprising:
    sending, from a mobile device, a request to receive a service from a communication entity as part of a communication session;
    generating, by the mobile device, a shared secret from contextual information and a master secret shared only with a home carrier, wherein the mobile device is a subscriber of the home carrier, the contextual information is derived from at least one circumstance corresponding to the communication session, and the home carrier is configured to independently generate the shared secret of the mobile device; and
    establishing, by the mobile device, a secure communication with the communication entity to obtain the requested service based on the shared secret, wherein the communication entity has no knowledge of the master secret and is configured to obtain the shared secret from the home carrier.

2. The method as in claim 1, wherein the contextual information further comprises topological information.

3. The method as in claim 1, wherein the contextual information further comprises time-based information.

4. The method as in claim 1, wherein the contextual information further comprises transactional information.

5. The method as in claim 1, further comprising receiving the contextual information from another communication entity.

6. The method as in claim 1, further comprising cryptographically communicating with the communication entity using the shared secret as key material.

7. A method for intermediating a trust relationship with at least two communication entities, comprising:
    receiving, by a home carrier from a first communication entity, a request for an authorization of a second communication entity having requested to receive a service from the first communication entity as part of a communication session, wherein the second communication entity is a subscriber of the home carrier;
    generating, by the home carrier, a shared secret from contextual information and a master secret shared only with the second communication entity, wherein the contextual information is derived from at least one circumstance corresponding to the communication session, and the second communication entity is configured to independently generate the shared secret of the home carrier; and
    providing, by the home carrier, authentication information and the shared secret to the first communication entity, wherein the first communication entity has no knowledge of the master secret and is configured to establish a secure communication with the second communication entity to provide the requested service based on the authentication information and the shared secret.

8. The method as in claim 7, wherein the contextual information further comprises topological information.

9. The method as in claim 7, wherein the contextual information further comprises time-based information.

10. The method as in claim 7, wherein the contextual information further comprises transactional information.

11. The method as in claim 7, further comprising receiving the contextual information from one of the first communication entity or the second communication entity.

12. The method as in claim 7, further comprising providing the shared secret in the authentication information to the first communication entity.

13. An apparatus for establishing a trust relationship with a communication entity, comprising:
hardware processor circuitry, comprising:
means for sending a request to receive a service from a communication entity as part of a communication session;
means for generating a shared secret from contextual information and a master secret shared only with a home carrier, wherein the apparatus is a subscriber of the home carrier, the contextual information is derived from at least one circumstance corresponding to the communication session, and the home carrier is configured to independently generate the shared secret of the apparatus;
and means for establishing a secure communication with the communication entity to obtain the requested service based on the shared secret, wherein the communication entity has no knowledge of the master secret and is configured to obtain the shared secret from the home carrier.

14. The apparatus as in claim 13, wherein the contextual information further comprises topological information.

15. The apparatus as in claim 13, wherein the contextual information further comprises time-based information.

16. The apparatus as in claim 13, wherein the contextual information further comprises transactional information.

17. The apparatus as in claim 13, further comprising means for receiving the contextual information from another communication entity.

18. The apparatus as in claim 13, further comprising means for cryptographically communicating with the communication entity using the shared secret as key material.

19. An apparatus for intermediating a trust relationship with at least two communication entities, comprising:
hardware processor circuitry, comprising:
means for receiving, from a first communication entity, a request for an authorization of a second communication entity having requested to receive a service from the first communication entity as part of a communication session, wherein the second communication entity is a subscriber of the apparatus;
means for generating a shared secret from contextual information and a master secret shared only with the second communication entity, wherein the contextual information is derived from at least one circumstance corresponding to the communication session, and the second communication entity is configured to independently generate the shared secret of the apparatus; and
means for providing authentication information and the shared secret to the first communication entity, wherein the first communication entity has no knowledge of the master secret and is configured to establish a secure communication with the second communication entity to provide the requested service based on the authentication information and the shared secret.

20. The apparatus as in claim 19, wherein the contextual information further comprises topological information.

21. The apparatus as in claim 19, wherein the contextual information further comprises time-based information.

22. The apparatus as in claim 19, wherein the contextual information further comprises transactional information.

23. The apparatus as in claim 19, further comprising means for receiving the contextual information from one of the first communication entity or the second communication entity.

24. The apparatus as in claim 19, further comprising means for providing the shared secret in the authentication information to the first communication entity.

25. An apparatus for establishing a trust relationship with a communication entity, comprising:
a memory unit including computer-readable instructions for:
sending a request to receive a service from a communication entity as part of a communication session,
generating a shared secret from contextual information and a master secret shared only with a home carrier, wherein the apparatus is a subscriber of the home carrier, the contextual information is derived from at least one circumstance corresponding to the communication session, and the home carrier is configured to independently generate the shared secret of the apparatus, and
establishing a secure communication with the communication entity to obtain the requested service based on the shared secret, wherein the communication entity has no knowledge of the master secret and is configured to obtain the shared secret from the home carrier; and
a processor circuit coupled to the memory unit for processing the computer-readable instructions.

26. The apparatus as in claim 25, wherein the contextual information further comprises topological information.

27. The apparatus as in claim 25, wherein the contextual information further comprises time-based information.

28. The apparatus as in claim 25, wherein the contextual information further comprises transactional information.

29. The apparatus as in claim 25, wherein the memory unit further comprises computer-readable instructions for receiving the contextual information from another communication entity.

30. The apparatus as in claim 25, wherein the memory unit further comprises computer-readable instructions for cryptographical communication with the communication entity using the shared secret.

31. An apparatus for intermediating a trust relationship with at least two communication entities, comprising:
a memory unit including computer-readable instructions for:
receiving, from a first communication entity, a request for an authorization of a second communication entity having requested to receive a service from the first communication entity as part of a communication session, wherein the second communication entity is a subscriber of the apparatus,
generating a shared secret from contextual information and a master secret shared only with the second communication entity, wherein the contextual information is derived from at least one circumstance corresponding to the communication session, and the second communication entity is configured to independently generate the shared secret of the apparatus, and
providing authentication information and the shared secret to the first communication entity, wherein the first communication entity has no knowledge of the master secret and is configured to establish a secure communication with the second communication entity to provide the requested service based on the authentication information and the shared secret; and
a processor circuit coupled to the memory unit for processing the computer-readable instructions.

32. The apparatus as in claim 31, wherein the contextual information further comprises topological information.

33. The apparatus as in claim 31, wherein the contextual information further comprises time-based information.

34. The apparatus as in claim 31, wherein the contextual information further comprises transactional information.

35. The apparatus as in claim 31, wherein the memory unit further comprises computer-readable instructions for receiving the contextual information from one of the first communication entity or the second communication entity.

36. The apparatus as in claim 31, wherein the memory unit further comprises computer-readable instructions for providing the shared secret in the authentication information to the first communication entity.

37. A non-transitory computer-readable medium storing computer-readable instructions for:

sending, from a mobile device, a request to receive a service from a communication entity as part of a communication session;

generating, by the mobile device, a shared secret from contextual information and a master secret shared only with a home carrier, wherein the mobile device is a subscriber of the home carrier, the contextual information is derived from at least one circumstance corresponding to the communication session, and the home carrier is configured to independently generate the shared secret of the mobile device; and establishing, by the mobile device, a secure communication with the communication entity to obtain the requested service based on the shared secret, wherein the communication entity has no knowledge of the master secret and is configured to obtain the shared secret from the home carrier.

38. The computer-readable medium as in claim 37, wherein the contextual information further comprises at least one of topological information, time-based information, or transactional information.

39. A non-transitory computer-readable medium storing computer-readable instructions for:

receiving, by a home carrier from a first communication entity, a request for an authorization of a second communication entity having requested to receive a service from the first communication entity as part of a communication session, wherein the second communication entity is a subscriber of the home carrier;

generating, by the home carrier, a shared secret from contextual information and a master secret shared only with the second communication entity, wherein the contextual information is derived from at least one circumstance corresponding to the communication session, and the second communication entity is configured to independently generate the shared secret of the home carrier; and providing, by the home carrier, authentication information and the shared secret to the first communication entity, wherein the first communication entity has no knowledge of the master secret and is configured to establish a secure communication with the second communication entity to provide the requested service based on the authentication information and the shared secret.

40. The computer-readable medium as in claim 39, wherein the contextual information further comprises at least one of topological information, time-based information, or transactional information.

41. The method as in claim 1, further comprising:
receiving an authenticity challenge message from the communication entity;
generating a first response based on the shared secret; and
transmitting the first response to the communication entity, wherein the communication entity is configured to also generate a second response based on the shared secret to compare with the first response for granting the requested service.

42. The method as in claim 7, wherein the first communication entity and the second communication entity are configured to exchange authenticity challenge data, comprising:
the first communication entity generating an authenticity challenge message based on the received authentication information and the shared secret for the second communication entity;
the second communication entity generating a first response based on the shared secret in response to the authenticity challenge message; and
the first communication entity generating a second response based on the shared secret to compare with the first response for granting the requested service.

* * * * *